No. 759,606. Patented May 10, 1904.

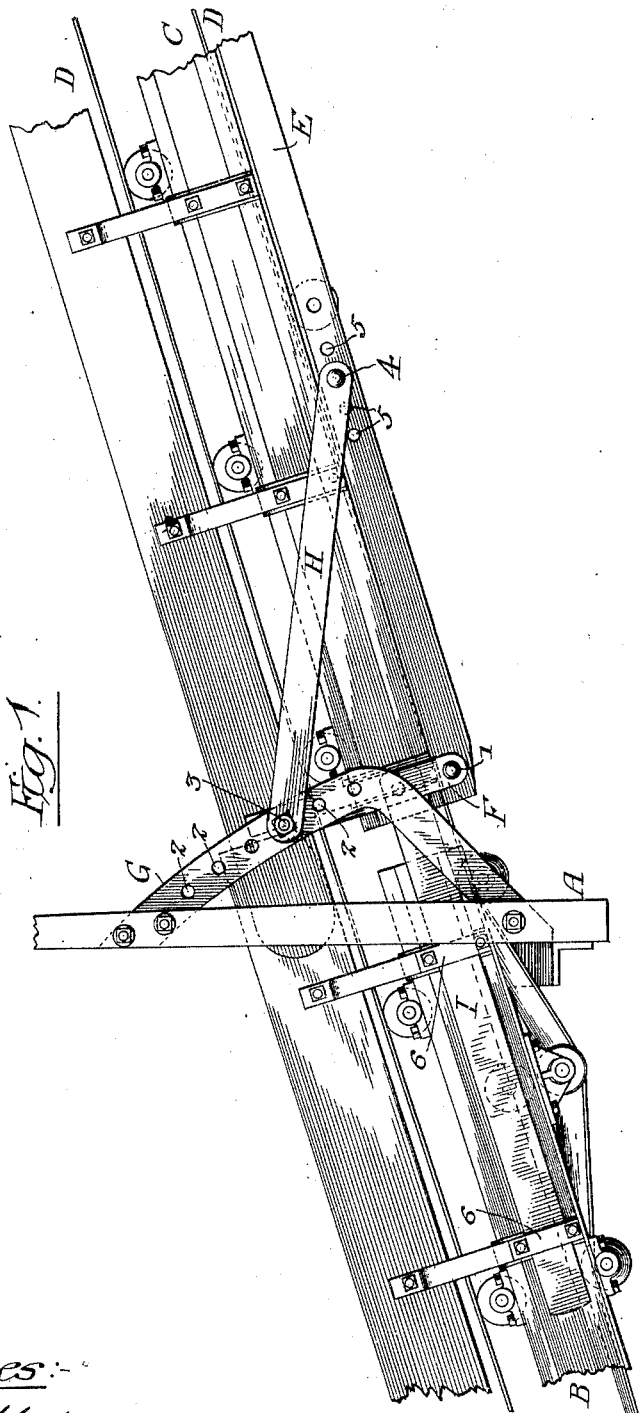

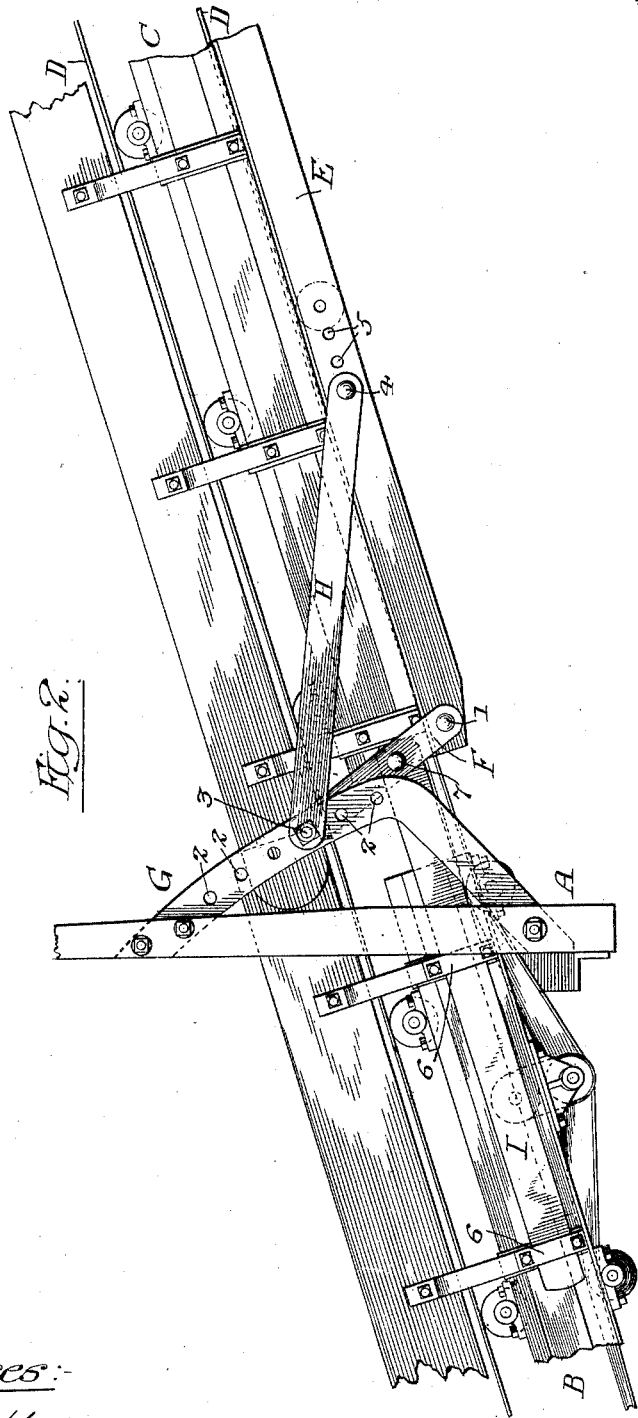

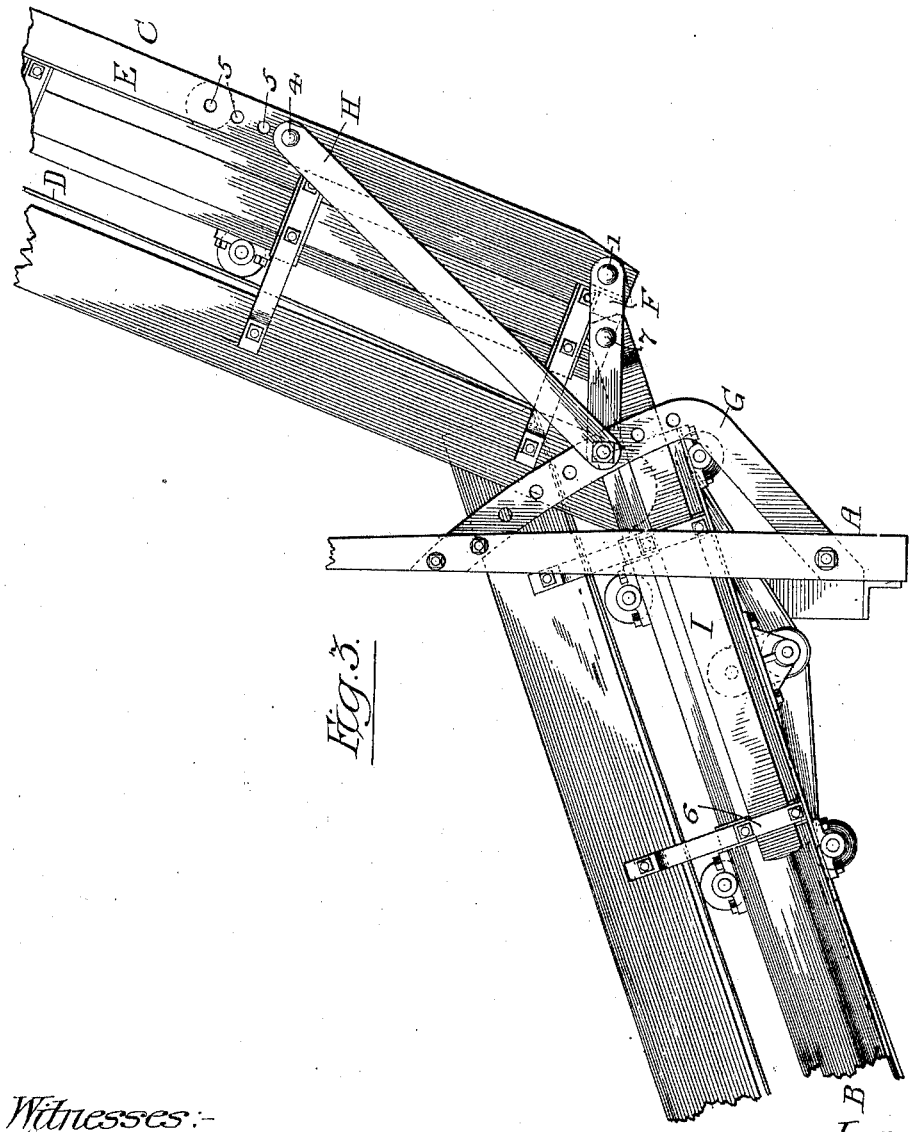

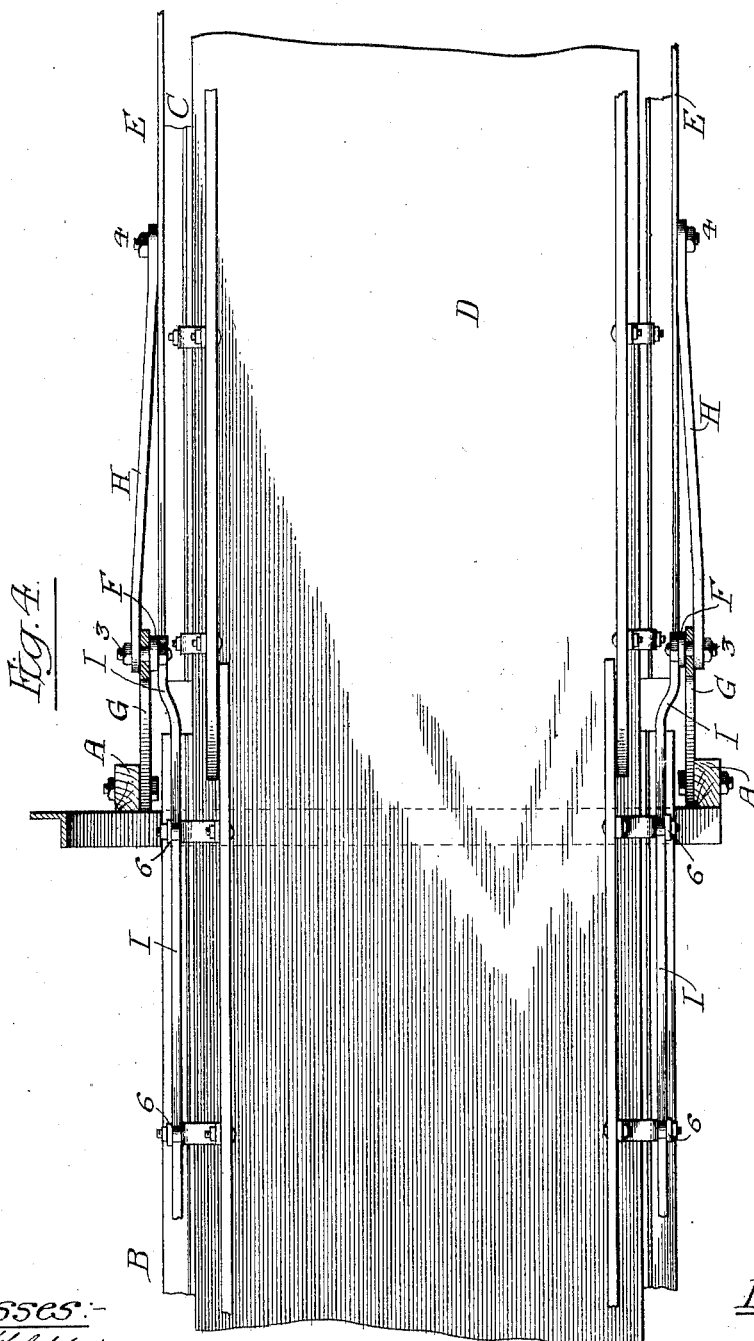

UNITED STATES PATENT OFFICE.

THOMAS J. GRAY, OF CHICAGO, ILLINOIS, ASSIGNOR TO NATIONAL DRILL AND MANUFACTURING COMPANY, OF CHICAGO, ILLINOIS, A CORPORATION OF WEST VIRGINIA.

GRADING AND DITCHING MACHINE.

SPECIFICATION forming part of Letters Patent No. 759,606, dated May 10, 1904.

Application filed January 14, 1904. Serial No. 189,032. (No model.)

*To all whom it may concern:*

Be it known that I, THOMAS J. GRAY, a citizen of the United States, residing at Chicago, in the county of Cook and State of Illinois, have invented certain new and useful Improvements in Grading and Ditching Machines, of which the following is a specification.

My invention relates to grading and ditching machines involving a carriage, an elevating-carrier, and a plow from which the loose soil is taken by the elevating-carrier and discharged thereby at a suitably-elevated point.

Objects of my invention are to avoid such an extent of separation between the bed-frame and the carrier-frame as will injure the belt when the carrier-frame is swung upwardly, to materially lessen the extent of certain connections between the two frame-sections when one of them is swung in a vertical plane independently of the other, to positively adjust the length of the elevating-carrier as a whole without interfering with the proper action of a hinge device for the carrier-frame section, to longitudinally adjust the carrier-frame section without tilting it, and to provide novel and improved means for hinging and supporting the carrier-frame section.

In the accompanying drawings, Figure 1 represents in side elevation a portion of the body frame of the machine and portion of the upper and lower elevating-carrier sections arranged and supported in accordance with my improvement. Fig. 2 is a view similar to Fig. 1, but showing the upper elevating-carrier section adjusted longitudinally in a direction away from the lower section, so as to compensate for stretch on the part of the endless belt. Fig. 3 is a side elevation generally corresponding with prior figures, but showing the upper elevating-carrier section swung upwardly to an extent to place it in an upright or nearly vertical position. Fig. 4 is a top plan view of Fig. 1.

The standards A A represent portions of the body-frame of a grading and ditching machine having a plow and a transversely-arranged elevating-carrier, an illustration of a machine of such general character being, for example, found in Letters Patent No. 275,614, April 10, 1883, to Edwards and Durkee. In said patent the elevating-carrier comprises two main lengths or sections, one being arranged under the body-frame and commonly termed the "bed-frame" and the other being hinged at one side of the body-frame to a pair of standards and commonly termed the "carrier-frame." These sections or lengths of the elevating-carrier are provided with belt-rolls for an endless carrier-belt, means being also provided for swinging the outer or carrier-frame section independently of the bed-frame section, so that when desired the former can be swung into a substantially upright position.

In the accompanying drawings, portions only of the lower bed-frame section B and the outer or upper carrier-section C of the elevating-carrier are illustrated, it being considered unnecessary to further illustrate the machine to which my improvements are applied. The elevating-carrier, as in preceding machines of this class, is also provided with an endless carrier-belt D. It is also understood that as in such prior machines the bed-frame section B is in practice positioned under the body-frame and arranged to extend upwardly from the plow and that the swinging carrier-frame length or section C, which practically forms a continuation of the bed-frame B, extends upwardly and outwardly from one side of the machine substantially as in the said Edwards and Durkee patent.

As the elevating-carrier involves like suspending and hinging devices at each of its two longitudinal sides, the following description of the suspending and hinging devices shown at one side, as in Figs. 1, 2, and 3, will also practically serve as a description of the corresponding suspending and hinging devices at the opposite side, it being apparent that the duplication of these devices is sufficiently illustrated in Fig. 4 to serve as a guide for the general arrangement involved.

With particular reference, therefore, to the suspending and hinging devices shown at one side of the elevating-carrier, E indicates a plate or bar secured to one side of the carrier-frame section C, and therefore practically forming a portion of such frame-section. A suspending-link F for the inner lower end of the carrier-frame section is pivoted at its lower end, as at 1, to the carrier-frame section, preferably to the bar or plate E, as shown, said link being hung at its upper end upon a fixture G on the body-frame.

The fixture G is shown as being a bar or plate secured to the standard A and provided with a series of bolt or pivot holes 2, arranged along the arc of a circle. The bolt or pivot 3, by which the link F is suspended, can be fitted to bear in any one of these holes 2, and hence the point at which the link is pivotally hung can be raised or lowered along the line of an arc by shifting the bolt 3 from one to another of such holes. Broadly considered, therefore, the point at which the suspension-link is hung can be adjusted up and down along the arc of a circle. It is understood that the circle thus referred to has its center at or near the lower end of the bed-frame B just back of the plow, so that when the axis of the hinge is thus raised or lowered, so as to raise or lower the elevating-carrier, the proper relative position between the plow and the bed-frame B will be maintained.

While the bar or plate forming the fixture G may be of any desired form, it is shown as practically forming a quadrant. The bolt 3 also provides a pivot for a link H, which connects the body-frame with the carrier-frame section C, the link H being considerably longer than the suspension-link F and having its outer lower end pivoted to the carrier-frame section—for example, to plate E—by means of a pivot 4. The pivot 4 is adjustable along the carrier-frame section for the purpose of longitudinally extending or contracting the elevating-carrier with reference to the condition of the belt D and its requirements. To such end the bar or plate E is provided with a series of bolt or pivot holes 5 for the bolt or pivot 4, whereby the adjustment of the latter along the carrier can be effected.

In Fig. 2 the pivotal connection between link H and the carrier-frame section is adjusted so as to lengthen the elevating-carrier relatively to its condition shown in Fig. 1, it being observed that in the condition shown in Fig. 1 the suspension-link F is nearly vertical, while in Fig. 2 it inclines back toward the body-frame as a result of such adjustment, which serves to project the outer carrier-frame section in a direction away from the bed-frame in order to lengthen the elevating-carrier as a whole.

The bed-frame section is also provided with a slide-bar I, which is guided by any suitable guide or guides 6, and arranged with its outer end pivoted to the suspension-link F at a point between the two pivoted ends of such link, as at 7, Fig. 2. When the suspension-link F is swung from the position shown in Fig. 1 to the position shown in Fig. 2 by reason of the projection of the carrier-frame section, the bar I will slide outwardly to an extent determined by the extent of such projection, it being observed, however, that as the pivotal connection between bar I and the suspension-link is between the ends of the latter the extent of outward movement on the part of bar I will be less than the outward movement of the lower end of the suspension-link, which is pivoted to the outer carrier-section.

When desired, the carrier-frame section C can be swung upwardly, as in Fig. 3, and in such case, while the suspension-link will swing upwardly, as illustrated, the forward-sliding movement of bar I will still be comparatively slight by reason of its hereinbefore-described connection with the suspension-link.

The suspension-link F thus arranged provides a swinging fulcrum, the slide-bar I being pivoted to such link in place of being pivoted directly to the carrier-frame section and the said link F being in turn pivotally supported upon the body-frame.

The devices thus illustrated at one side of the elevating-carrier are duplicated at the opposite side thereof and are therefore, so far as visible in Fig. 4, indicated by reference letters and numerals corresponding with those of the first three figures.

What I claim as my invention is—

1. In a grading and ditching machine, the elevating-carrier comprising a bed-frame section and a carrier-frame section; swinging suspension-links supported upon the body-frame of the machine and pivoted to the inner end portion of the carrier-frame section; and links having pivotal connections with the carrier-frame section arranged for adjustment along the latter, said links and also the said suspending-links being hung to swing about an upwardly and downwardly adjustable axis.

2. In a grading and ditching machine, the elevating-carrier provided with suspension-links which are hung to swing upon the body-frame about a pivotal connection therewith which is adjustable up and down along the arc of a circle such as described.

3. In a grading and ditching machine, the elevating-carrier comprising a bed-frame and a carrier-frame, and provided with suspension-links which are hung upon the body-frame; and slide-bars connected with the bed-frame and having pivotal connection with the suspension-links between the pivoted ends of the latter.

4. In a grading and ditching machine, the elevating-carrier comprising a bed-frame and a carrier-frame; suspension-links hung for up and down adjustment on the body-frame and pivoted to the carrier-frame; slide-bars arranged upon the bed-frame and pivoted to the suspension-links; and links H hung upon the body-frame and attached to the carrier-frame by pivotal connection adjustable along such frame.

THOMAS J. GRAY.

Witnesses:
W. A. MORTON,
GEO. W. GALEHOUSE.